United States Patent
Kim et al.

(10) Patent No.: US 10,908,337 B2
(45) Date of Patent: Feb. 2, 2021

(54) POLARIZING PLATE AND OPTICAL DISPLAY COMPRISING THE SAME

(71) Applicant: Samsung SDI Co., Ltd., Yongin-si (KR)

(72) Inventors: Yoo Jin Kim, Suwon-si (KR); Jin Woo Kim, Suwon-si (KR); Dong Yoon Shin, Suwon-si (KR); Bae Wook Lee, Suwon-si (KR); Sung Man Cho, Suwon-si (KR); Ji Hyun Hwang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 112 days.

(21) Appl. No.: 16/205,076

(22) Filed: Nov. 29, 2018

(65) Prior Publication Data
US 2019/0196078 A1    Jun. 27, 2019

(30) Foreign Application Priority Data
Dec. 21, 2017  (KR) ................. 10-2017-0177598

(51) Int. Cl.
*G02B 5/30* (2006.01)
*G02F 1/1335* (2006.01)
*G02B 5/00* (2006.01)

(52) U.S. Cl.
CPC ........... *G02B 5/3025* (2013.01); *G02B 5/003* (2013.01); *G02F 1/133512* (2013.01); *G02F 1/133528* (2013.01)

(58) Field of Classification Search
CPC ............. G02B 5/3025; G02B 5/003; G02F 1/133512; G02F 1/133528
(Continued)

(56) References Cited

U.S. PATENT DOCUMENTS 10,598,977 B2 *   3/2020   Wu .................... G02B 5/0231
10,627,665 B2 *   4/2020   Kim .................... H01L 33/483
(Continued)

FOREIGN PATENT DOCUMENTS

JP    2014-238533 A    12/2014
JP    2016-65928 A    4/2016
(Continued)

OTHER PUBLICATIONS

Taiwan Office Action from corresponding Taiwan Patent Application No. 107141880, Taiwan Office action dated Aug. 16, 2019 (7 pgs.).
(Continued)

*Primary Examiner* — Ricky D Shafer
(74) *Attorney, Agent, or Firm* — Lewis Roca Rothgerber Christie LLP

(57) ABSTRACT

A polarizing plate and an optical display comprising the same. The polarizing plate includes a polarizer; and a bonding layer and a first polarizer protective film sequentially stacked on a lower surface of the polarizer, wherein the first polarizer protective film includes a light shielding layer formed in at least some region on an upper surface thereof and the light shielding layer is composed of at least one printed pattern, the printed pattern being composed of a single printed layer or multiple printed layers and having a first plane formed at a top portion thereof and an inclined angle θ of greater than about 0° to about 85° or less, the inclined angle being defined between the first polarizer protective film and an imaginary line I-II connecting one distal end point I of the first plane at the top portion of the printed pattern to a point II disposed on an outer peripheral surface of the printed pattern adjoining the first polarizer protective film and closest to the distal end point I.

19 Claims, 4 Drawing Sheets

(58) Field of Classification Search
USPC .......................................... 359/483.01, 487.02
See application file for complete search history.

(56) References Cited

U.S. PATENT DOCUMENTS

| | | |
|---|---|---|
| 2010/0259829 A1* | 10/2010 | Kim ..................... G02B 27/026 |
| 2015/0036074 A1 | 2/2015 | Park et al. |
| 2017/0068128 A1 | 3/2017 | Lim et al. |
| 2018/0297349 A1* | 10/2018 | Lim ........................ G06F 3/044 |
| 2019/0025484 A1* | 1/2019 | Kim ........................ G02B 5/003 |
| 2019/0025486 A1* | 1/2019 | Hwang ............... H01L 51/5253 |
| 2019/0204479 A1* | 7/2019 | Hwang ................ C08K 5/3492 |

FOREIGN PATENT DOCUMENTS

| | | |
|---|---|---|
| KR | 10-2015-0015243 | 2/2015 |
| KR | 10-2017-0084627 A | 7/2017 |
| TW | 201423689 A | 6/2014 |

OTHER PUBLICATIONS

Taiwan Office Action in corresponding Taiwan Application No. 107141880, Taiwan Office action dated Feb. 14, 2020 (7 pgs.).
Korean Office Action dated Nov. 28, 2019 in corresponding Korean Patent Application No. 10-2017-0177598 (5 pgs.).

* cited by examiner

POLARIZING PLATE AND OPTICAL DISPLAY COMPRISING THE SAME

CROSS-REFERENCE TO RELATED APPLICATION

This application claims priority to and the benefit of Korean Patent Application No. 10-2017-0177598, filed on Dec. 21, 2017 in the Korean Intellectual Property Office, the entire disclosures of which are incorporated herein by reference.

BACKGROUND

1. Field

The present invention relates to a polarizing plate and an optical display including the same.

2. Description of the Related Art

An optical display is composed of a display region and a non-display region. The display region is light transmissive and displays an image to be viewed through a screen. The non-display region is disposed along the periphery of the display region to surround the display region. The non-display region is provided with a printed circuit board, a drive chip, and the like so as not to be visible to a user of an optical display. The non-display region may include a light shielding layer and the like.

In recent years, a technique of coupling a polarizer to a protective film having a light shielding layer formed thereon has been developed to achieve a slim structure of an optical display. The light shielding layer may include printed patterns each composed of a single printed layer or multiple printed layers. Since the printed layer forms steps with respect to the surface of the protective film, bubbles can be generated during a process of coupling the polarizer to the protective film. The generated bubbles can affect the external appearance of a polarizing plate or can obstruct user view with respect to a screen of the optical display. Further, since thickness reduction of the printed patterns can cause insufficient light shielding, there is a limit in thickness reduction of the printed patterns.

The background technique of the present invention is disclosed in Korean Patent Laid-open Publication No. 2015-0015243, the entire content of which is incorporated herein by reference.

SUMMARY

It is an object of the present invention to provide a polarizing plate that includes a polarizer protective film including a light shielding layer formed thereon, which can prevent bubble generation or minimize the size of bubbles upon bonding of the polarizer protective film to a polarizer.

It is another object of the present invention to provide a polarizing plate that can improve black uniformity of the light shielding layer to improve a light shielding effect.

In accordance with one aspect of the present invention, a polarizing plate includes a polarizer; and a bonding layer and a first polarizer protective film sequentially stacked on a lower surface of the polarizer, wherein the first polarizer protective film includes a light shielding layer formed in at least some region on an upper surface thereof and the light shielding layer includes at least one printed pattern composed of a single printed layer or multiple printed layers, the printed pattern having a first plane formed at a top portion thereof and an inclined angle α of greater than about 0° to about 85° or less, the inclined angle being defined between the first polarizer protective film and an imaginary line I-II connecting one distal end point I of the first plane at the top portion of the printed pattern to a point II disposed on an outer peripheral surface of the printed pattern adjoining the first polarizer protective film and closest to the distal end point I.

The inclined angle θ may range from about 0.1° to about 50°.

The printed layer may have a base angle α of greater than about 0° to about 90°.

The light shielding layer may have a smaller thickness than the bonding layer.

The printed pattern may be composed of a single printed layer and the printed layer may have a base angle α of greater than about 0° to about 85°.

The printed pattern may be composed of multiple printed layers and each of the printed layers may have a base angle α of greater than about 0° to less than about 90°.

The multiple printed layers may have a gradually decreasing cross-sectional area in a plane direction thereof with increasing distance from the first polarizer protective film.

The multiple printed layers may have the same thickness or different thicknesses with increasing distance from the first polarizer protective film.

The printed pattern may be composed of multiple printed layers and each of the printed layers may have a base angle α of about 90°.

The multiple printed layers may have a gradually decreasing cross-sectional area in a plane direction thereof with increasing distance from the first polarizer protective film.

The multiple printed layers may have the same thickness or different thicknesses with increasing distance from the first polarizer protective film.

The printed patterns may be separated from each other.

The polarizing plate may be composed of a display region and a non-display region surrounding the display region; the light shielding layer may constitute at least a portion of the non-display region; and each of the printed patterns may include a first printed layer, and wherein, when a point at which one first printed layer adjoins an interface between the display region and the non-display region is indicated by Point a, a point at which another first printed pattern adjacent to the one first printed pattern adjoins the interface between the display region and the non-display region is indicated by Point b, the closest vertex or inflection point in the first printed pattern to Point a is indicated by Point c, and the closest vertex or inflection point in the first printed pattern to Point b is indicated by Point d, a minimum value H among a distance from the interface between the display region and the non-display region to Point c and a distance from the interface between the display region and the non-display region to Point d may be about 200 μm or less.

The printed layer may have a regular hexagonal, rhombus or amorphous cross-sectional shape in a plane direction.

The printed pattern may be formed of a photocurable composition or a thermosetting composition for printed layers including a pigment, a binder resin and an initiator.

The pigment may include at least one of carbon black and a silver-tin alloy.

Each of the photocurable composition for printed layers and the thermosetting composition for printed layers may further include at least one of a photocurable unsaturated compound and a thermosetting unsaturated compound.

The bonding layer may be formed of a bonding agent including a (meth)acrylic compound and an epoxy compound.

The polarizing plate may further include a second polarizer protective film stacked on an upper surface of the polarizer.

In accordance with one aspect of the present invention, an optical display includes the polarizing plate according to the present invention.

DETAILED DESCRIPTION

Figure 1:
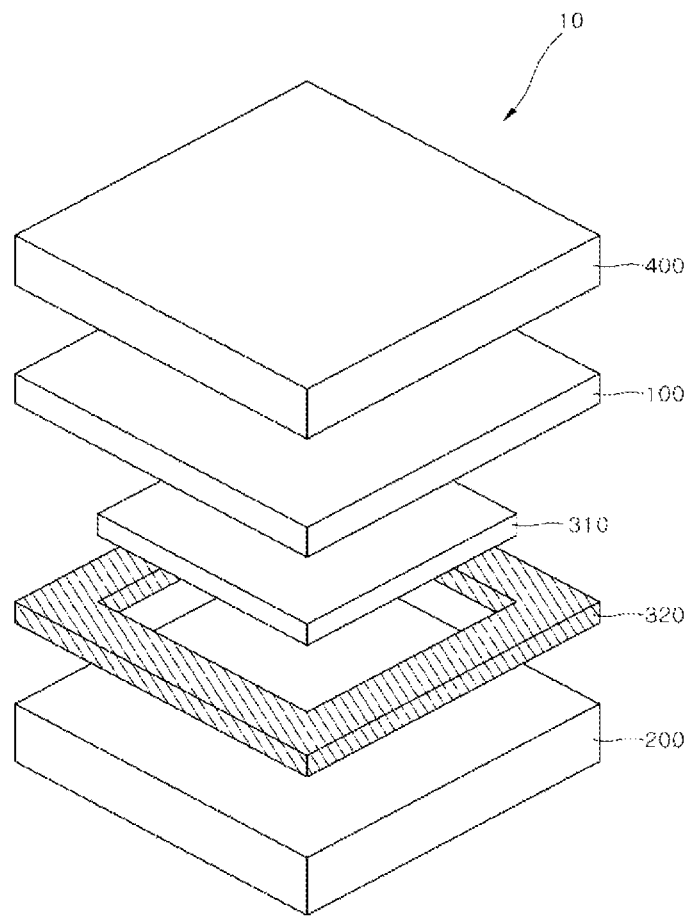
FIG. 1 is a perspective view of a polarizing plate according to one embodiment of the present invention.

Embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that the term "upper surface" can be used interchangeably with the term "lower surface", and when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, the term "top portion" refers to the highest portion in a printed pattern.

According to one or more embodiments of the present invention, a polarizing plate includes: a polarizer; a bonding layer and a first polarizer protective film sequentially stacked on a lower surface of the polarizer; and a light shielding layer on an upper surface of the first polarizer protective film. The polarizing plate is composed of a display region and a non-display region, and the light shielding layer constitutes at least a portion of the non-display region. In the polarizing plate according to the present invention, the light shielding layer is embedded in the bonding layer, thereby enabling thickness reduction of an optical display.

The light shielding layer includes at least one printed pattern. The printed pattern is composed of a single printed layer or two or more printed layers. The printed pattern has a first plane at the top portion thereof and may have an inclined angle θ of greater than about 0° to about 85°. In one or more embodiments, the inclined angle is defined between the first polarizer protective film and an imaginary line I-II connecting a first distal end point I of a surface at the top portion of the printed pattern to a second distal end point II of a second surface at the bottom portion of the printed pattern on the first polarizer protective film and closest to the first distal end point I. Within this range of the angle θ, the light shielding layer can prevent or minimize bubble generation upon bonding of the polarizer to the protective film having the light shielding layer thereon via a bonding agent (e.g., the bonding layer), and can achieve a high light shielding effect through improvement of black uniformity.

Herein, the angle θ means an angle of less than about 90° defined as an interior angle between the imaginary line connecting the point I to the point II and the second surface at the bottom of the printed pattern (or the upper surface of the first polarizer protective film) and will be defined as an "inclined angle θ" hereinafter. For example, the inclined angle θ may range from about 0.1° to about 50°, from about 0.1° to about 30°, or from about 0.1° to about 10°. Since thickness reduction of the light shielding layer can cause deterioration of the light shielding effect through deterioration in black uniformity of the light shielding layer, there is a limit in reduction of the thickness of the light shielding layer. Within this range of the inclined angle θ, the polarizing plate can achieve a sufficient thickness of the light shielding layer while preventing bubble generation upon bonding the polarizer to the polarizer protective film, and can improve the light shielding effect of the light shielding layer through improvement in black uniformity of the light shielding layer.

Hereinafter, the polarizing plate according to the present invention will be described in detail with reference to FIG. 1, FIG. 2, FIG. 3 and FIG. 4.

Referring to FIG. 1, a polarizing plate 10 according to one embodiment of the present invention may include a polarizer 100, a first polarizer protective film 200 stacked on a lower surface of the polarizer 100 via a bonding layer 310, and a second polarizer protective film 400 stacked on an upper surface of the polarizer 100. A light shielding layer 320 is formed inside the bonding layer 310.

Although not shown in FIG. 1, the polarizing plate may further include an adhesive layer formed on an upper surface of the second polarizer protective film 400 and a functional layer formed on a lower surface of the first polarizer protective film 200. The functional layer can provide an additional function to the polarizing plate and can provide at least one of anti-fingerprint, low reflection, anti-glare, anti-contamination, anti-reflection, diffusion and refraction functions.

The polarizing plate 10 may be a polarizing plate at a viewer side on a display panel of an optical display. Accordingly, the bonding layer 310 and the first polarizer protective film 200 are sequentially formed on a light exit surface of the polarizer 100.

Figure 2:
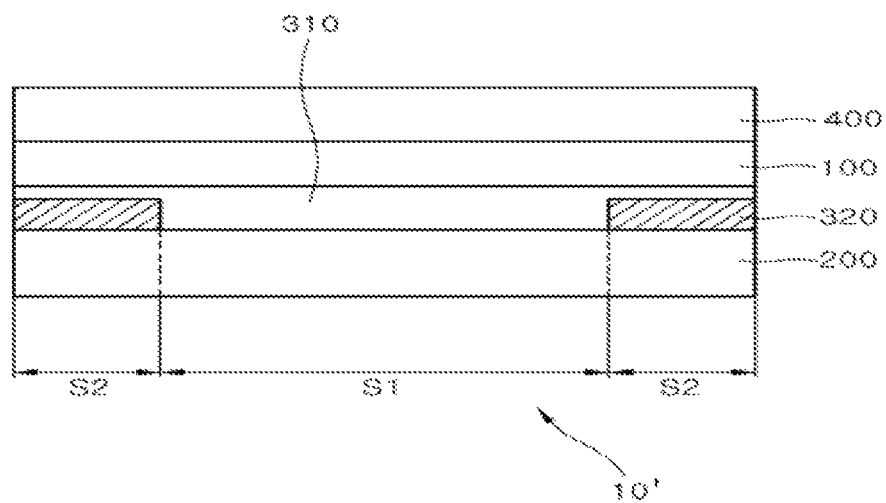
FIG. 2 is a sectional view of the polarizing plate according to an embodiment of the present invention.

Referring to FIG. 2, a polarizing plate 10' according to one embodiment includes a display region S1 and a non-display region S2 surrounding the periphery of the display region S1 and corresponding to the light shielding layer 320. The display region S1 is a light transmissive region and the non-display region S2 is an opaque region.

The light shielding layer 320 is formed on an upper surface of the first polarizer protective film 200 and embedded in the bonding layer 310. The light shielding layer 320 is formed along the periphery of the bonding layer 310 and is integrated with the bonding layer 310, thereby enabling thickness reduction of an optical display compared to a polarizing plate in which the shielding layer and the bonding layer are not integrated. The light shielding layer 320 constitutes at least a portion of the non-display region S2 upon mounting of the polarizing plate according to the present invention on the optical display.

The light shielding layer 320 is formed on a light exit surface of the polarizer 100. Accordingly, a display function can be realized in a region of the polarizing plate in which the light shielding layer 320 is not formed. Alternatively, the light shielding layer 320 may be formed on a light incident surface of the polarizer 100.

Next, components of the polarizing plates according to the present invention will be described in detail.

Light Shielding Layer

Referring to FIG. 1, the light shielding layer 320 may have a partially open space between the polarizer 100 and the first polarizer protective film 200. That is, the light shielding layer 320 may have a closed polygonal shape and may include a partially empty interior space. Accordingly, the "interior space" of the light shielding layer 320 may be defined as an empty space inside the light shielding layer 320, which constitutes the closed polygonal shape. The light shielding layer 320 may be disposed on a portion of, or the entirety of, an outer periphery of each of the polarizer 100 and the first polarizer protective film 200 in horizontal cross-sectional view. However, it should be understood that the present invention is not limited thereto. The light shielding layer 320 may be formed of a composition of printed layers, although the present disclosure is not limited thereto.

Figure 3:
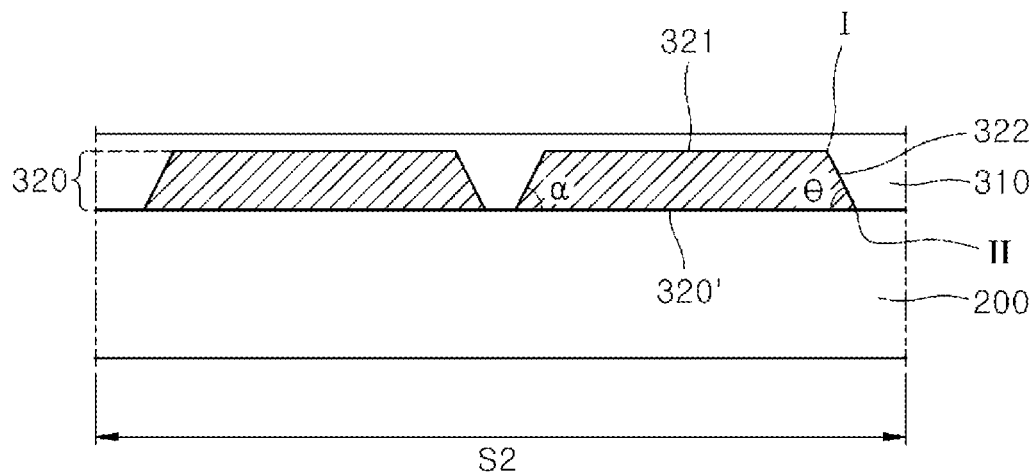
FIG. 3 is an enlarged sectional view of a non-display region of a polarizing plate according to an embodiment of the present invention.

Referring to FIG. 3, the light shielding layer 320 may include one or more printed patterns 320', which may constitute at least a portion of the non-display region S2. In one embodiment, the light shielding layer 320 may be composed of a plurality of printed patterns 320' separated from each other, although the present disclosure is not limited thereto.

In the illustrated embodiment, the printed pattern 320' is composed of a single printed layer. Alternatively, the printed pattern may be composed of multiple printed layers. The printed pattern composed of the multiple printed layers will be described in detail below.

The printed pattern 320' has a first surface 321 at the top portion thereof, a second surface 323 at the bottom portion thereof, and a side 324 which may have an inclined angle θ of greater than about 0° to about 85° or less. In one embodiment, the inclined angle θ is defined as an interior angle between the second surface 323 of the printed pattern 320' an imaginary line 322 (I-II) connecting a first distal end point I of the first surface 321 at the top portion of the printed pattern 320' to a second distal end point II of the second surface 323 of the printed pattern 320' adjoining the upper surface of the first polarizer protective film 200 facing the lower surface of the polarizer 100 and closest to the first distal end point I. Within this range of the inclined angle θ, the light shielding layer 320 can prevent or minimize bubble generation upon bonding of the polarizer to the protective film 200 having the light shielding layer 320 thereon via a bonding agent (e.g., the bonding layer 310), and can achieve a high light shielding effect through improvement of black uniformity thereof. The inclined angle θ may range from about 0.1° to about 50°, for example, about 0.1° to about 30°, or about 0.1° to about 10°. Within this range of the inclined angle θ, the light shielding layer 320 can suppress bubble generation and can improve the light shielding effect through improvement of black uniformity of the light shielding layer 320. The first surface 321 may be parallel to the first polarizer protective film 200, but embodiments of the present disclosure are not limited thereto.

An interior angle α defined between the first polarizer protective film 200 and an inclined surface of the printed layer constituting the printed pattern 320' or an interior angle α defined between the first polarizer protective film 200 and an inclined surface of the printed layer constituting the printed pattern 320' closest to the first polarizer protective film 200 may be greater than about 0° to about 90°, for example, greater than about 0° to about 85°, about 30° to about 85°, about 45° to about 85°, about 0.1° to about 50°, about 0.1° to about 30°, or about 0.1° to about 10°. Within this range of the angle α, the light shielding layer 320 can prevent bubble generation upon bonding of the polarizer to the protective film 200 having the light shielding layer 320 thereon via a bonding agent (e.g., the bonding layer 310), and can achieve black uniformity. Herein, the interior angle α means an angle of about 90° or less and will be defined as a "base angle α". FIG. 3 shows the structure of the printed pattern composed of a single printed layer in which the inclined angle θ is the same as the base angle α.

Referring to FIG. 3, the printed pattern 320' may have a trapezoidal cross-sectional shape in the thickness direction thereof, although the present disclosure is not limited thereto. Alternatively, in one or more embodiments, the printed pattern 320' may have a trapezoidal cross-sectional shape with a curved surface on at least a portion thereof, an N-gonal shape (N being an integer of 5 to 10), or an N-gonal shape with a curved surface on at least a portion thereof. As shown in FIG. 3, the printed pattern 320' may include printed layers having the same cross-sectional shape in the thickness direction thereof and separated from each other, or may include printed layers having different cross-sectional shapes in the thickness direction thereof and separated from each other.

The printed pattern 320' may have a hexagonal shape in the plane direction. However, it should be understood that the present invention is not limited thereto. For example, the printed pattern 320' may have an n-gonal shape (n being an integer of 3 to 10), such as a rhombus shape (n=4), a regular hexagonal shape (n=6) and/or an octagonal shape (n=8), a circular shape, an elliptical shape, or an amorphous shape. In the cross-sectional shape of the printed pattern 320' in the plane direction, sides constituting the printed pattern 320' may have the same or different lengths. For example, each of the sides constituting the printed pattern 320' may have a length of about 10 μm to about 400 μm, for example, about 50 μm to about 300 μm. In one embodiment, the printed pattern may have a rhombus, regular hexagonal or amorphous cross-sectional shape in the plane direction.

Figure 4:
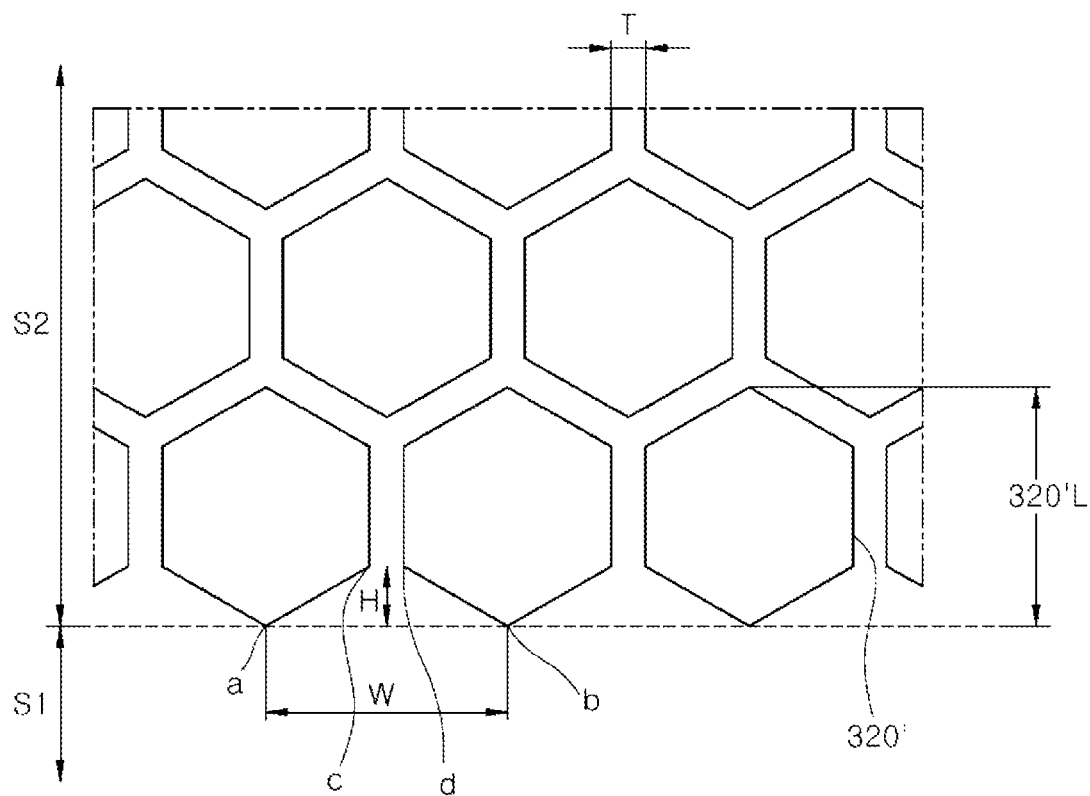
FIG. 4 is a partially enlarged plan view of a display region and the non-display region shown in FIG. 3.

Referring to FIG. 4, the point at which one printed pattern 320' adjoins the interface between the display region S1 and the non-display region S2 is indicated by Point a, and the point at which another printed pattern 320' adjacent to the one printed pattern 320' adjoins the interface between the display region S1 and the non-display region S2 is indicated by Point b. A distance between Point a and Point b is indicated by W. In addition, the closest vertex or inflection point of the one printed pattern 320' to Point a is indicated by Point c and the closest vertex or inflection point of the other printed pattern 320' to Point b is indicated by Point d. A minimum value among the distance from the interface between the display region S1 and the non-display region S2 to Point c and the distance from the interface between the display region S1 and the non-display region S2 to Point d is indicated by H. I one embodiment, H may be about 200 µm or less, for example, about 0.1 µm to about 200 µm or about 5 µm to about 200 µm. Within this range of H, the light shielding layer 320 can achieve the light shielding effect and uniformity between the display region S1 and the non-display region S2 can be improved to reduce a visibility difference therebetween while preventing RGB in a pixel from being visible. In one embodiment, the printed pattern 320' may satisfy Relation 1.

[Relation 1]

About $0.1 \times W \leq H \leq$ about $0.5 \times W$.

Relation 1 is set to achieve uniformity at the interface between the display region S1 and the non-display region S2 in order to achieve uniformity of the first printed pattern 320' directly adjoining the interface between the display region and the non-display region. In one embodiment, W may range from about 10 µm to about 500 µm, for example, about 10 µm to about 490 µm or about 10 µm to about 480 µm. For example, W may be greater than H (W>H).

As used herein, the term "interface between the display region and the non-display region" refers to an (imaginary) line connecting points of the printed pattern formed in the non-display region S2, which are closest to the display region S1.

The printed patterns 320' are separated from each other. A separation distance T between the printed patterns 320' may range from about 1 µm to about 50 µm, for example, about 5 µm to about 30 µm. Within this range, the light shielding layer 320 can provide the light shielding effect without adversely affecting uniformity.

A maximum major axis 320'L of the printed pattern 320' may have a length of about 50 µm to about 600 µm, for example, about 100 µm to about 500 µm.

The printed pattern 320' may be formed by depositing the composition for printed layers, followed by curing. The composition for printed layers may be deposited by gravure coating, spin coating, and the like, although the present disclosure is not limited thereto. The printed patterns shown in FIG. 3 and FIG. 4 may be formed by printing the composition for printed layers once.

The composition for printed layers may be a photocurable composition or a thermosetting composition, which may include a pigment, a binder resin and an initiator. With these components, the printed patterns may be formed to a thinner thickness. In one embodiment, the composition for printed layers may further include a reactive unsaturated compound, a solvent, and an additive.

The pigment may include carbon black, a mixed pigment of silver-tin alloys, or a combination thereof. Examples of carbon black may include graphite, furnace black, acetylene black, and Ketjen black, although the present disclosure is not limited thereto. The pigment may be present in the form of a pigment dispersion, although the present disclosure is not limited thereto.

The binder resin may include an acrylic resin, a polyimide resin, a polyurethane resin, or combinations thereof. The acrylic resin may include methacrylic acid/benzyl methacrylate copolymer, methacrylic acid/benzyl methacrylate/styrene copolymer, methacrylic acid/benzyl methacrylate/2-hydroxyethylmethacrylate copolymer, methacrylic acid/benzyl methacrylate/styrene/2-hydroxyethylmethacrylate copolymer, and the like. The polyurethane resin may be an aliphatic polyurethane resin. The acrylic resin may be a pressure sensitive adhesive resin. However, it should be understood that the present invention is not limited thereto.

The reactive unsaturated compound is a compound having a lower weight average molecular weight than the binder resin and may include at least one of a photocurable unsaturated compound and a thermosetting unsaturated compound. Examples of the reactive unsaturated compound may include ethylene glycol diacrylate, ethylene glycol dimethacrylate, diethylene glycol diacrylate, triethylene glycol diacrylate, triethylene glycol dimethacrylate, 1,6-hexanediol diacrylate, 1,6-hexanediol dimethacrylate, pentaerythritol tri(meth)acrylate, pentaerythritol tetra(meth)acrylate, dipentaerythritol penta(meth)acrylate, dipentaerythritol hexa(meth)acrylate, bisphenol A epoxy (meth)acrylate, ethylene glycol monomethylether (meth)acrylate, trimethylolpropane tri(meth)acrylate, and tris(meth)acryloyloxyethyl phosphate, although the present disclosure is not limited thereto.

The initiator may include at least one of a photocurable initiator and a heat-curing initiator.

The photocurable initiator may include acetophenone, benzophenone, thioxanthone, benzoin, triazine, and morpholine compounds, although the present disclosure is not limited thereto.

The heat-curing initiator may include at least one selected from the group consisting of, for example, hydrazide compounds, such as 1,3-bis(hydrazinocarbonoethyl-5-isopropylhydantoin); imidazole compounds, such as 1-cyanoethyl-2-phenylimidazole, N-[2-(2-methyl-1-imidazolyl)ethyl] urea, 2,4-diamino-6-[2'-methylimidazolyl-(1')]-ethyl-s-triazine, N,N'-bis(2-methyl-1-imidazolylethyl)urea, N,N'-(2-methyl-1-imidazolylethyl)-adipamide, 2-phenyl-4-methyl-5-hydroxymethylimidazole, and 2-phenyl-4,5-dihydroxymethylimidazole; acid anhydrides, such as tetrahydrophthalic acid, ethylene glycol-bis(anhydrotrimellitate); melamine compounds; guanidine compounds; dicyandiamides; and modified aliphatic polyamines.

The solvent may include glycol ethers, such as ethylene glycol methylether, ethylene glycol ethylether, propylene glycol methylether, and the like; cellosolve acetates, such as methyl cellosolve acetate, ethyl cellosolve acetate, diethyl cellosolve acetate, and the like; carbitols, such as methylethyl carbitol, diethyl carbitol, diethylene glycol monomethylether, diethylene glycol monoethylether, diethylene glycol dimethylether, diethylene glycol methylethylether, diethylene glycol diethylether, and the like; and propylene glycol alkylether acetates, such as propylene glycol methylether acetate, propylene glycol propylether acetate, and the like, although the present disclosure is not limited thereto.

The composition for printed layers may further include about 0.1 wt % to about 1 wt % of other additives. The other additives may include a silane coupling agent to improve bonding strength between the printed pattern and the polarizer protective film.

In one embodiment, the composition for printed layers may include about 1 wt % to about 50 wt % of the pigment (or the pigment dispersion), about 0.5 wt % to about 20 wt % of the binder resin, about 0.1 wt % to about 10 wt % of the initiator, and the balance of the solvent. Within this range, the composition can achieve formation of the printed layer having a thin thickness while providing a good light shielding effect.

In another embodiment, the composition for printed layers may include about 1 wt % to about 50 wt % of the pigment (or the pigment dispersion), about 0.5 wt % to about 20 wt % of the binder resin, about 1 wt % to about 20 wt % of the reactive unsaturated compound, about 0.1 wt % to about 10 wt % of the initiator, and the balance of the solvent. Within this range, the composition can achieve formation of the printed layer having a slim thickness while providing a good light shielding effect.

The printed layer may be formed by photocuring or heat-curing the composition for the printed layers, or by a combination thereof. Photocuring and heat-curing may be performed by a typical method well-known to those skilled in the art.

The thickness of the light shielding layer 320 may be less than or equal to the thickness of the bonding layer 310. For example, the light shielding layer 320 may have a smaller thickness than the bonding layer 310. The thickness of the light shielding layer 320 may be about 50% to about 100% the thickness of the bonding layer 310. FIG. 1 shows the structure wherein the light shielding layer 320 has the same thickness as the bonding layer 310 and FIG. 2 shows the structure wherein the light shielding layer 320 has a smaller thickness than the bonding layer 310. Within this thickness range, the light shielding layer 320 can be included in the bonding layer 310, which enables thickness reduction of the polarizing plate 10. For example, the light shielding layer 320 may have a thickness of about 4 μm or less, for example, about 0.1 μm to about 4 μm or about 1 μm to about 4 μm. Within this thickness range, the light shielding layer 320 can be included in the bonding layer 310, thereby achieving light shielding effects while enabling thickness reduction of the polarizing plate 10.

Polarizer

The polarizer 100 may be formed on an upper surface of the bonding layer 310 to polarize incident light.

The polarizer 100 may include a typical polarizer known to those skilled in the art. In one embodiment, the polarizer may include a polyvinyl alcohol-based polarizer obtained by uniaxially stretching a polyvinyl alcohol film, followed by dyeing the stretched film with dichroic dyes. The polarizer may have a thickness of about 5 μm to about 40 μm. Within this thickness range, the polarizer can be used for an optical display.

Bonding Layer

The bonding layer 310 is interposed between the polarizer 100 and the first polarizer protective film 200 to bond the polarizer 100 to the first polarizer protective film 200. The bonding layer 310 is directly formed on each of the polarizer 100 and the first polarizer protective film 200.

The bonding layer 310 may be formed on at least one surface of each of the polarizer 100 and the first polarizer protective film 200. The polarizer 100 and the first polarizer protective film 200 may face each other and have substantially the same area in horizontal cross-sectional view. That is, the polarizer 100 and the protective film 200 may completely overlap each other in horizontal cross-sectional view. In one embodiment, the bonding layer 310 may be formed on at least part of the polarizer 100 and the first polarizer protective film 200. For example, as shown in FIG. 1, the bonding layer 310 may be disposed in an island shape only at the center of polarizer 100 and the first polarizer protective film 200 excluding the peripheries thereof.

The bonding layer 310 may be directly formed on the light shielding layer 320 such that the light shielding layer 320 can be stably disposed inside the polarizing plate 10.

The bonding layer 310 may include a water-based bonding agent or a UV-curable bonding agent. The water-based bonding agent may include at least one selected from the group consisting of polyvinyl alcohol resins and vinyl acetate resins, or may include a polyvinyl alcohol resin having a hydroxyl group, although the present disclosure is not limited thereto. The UV-curable bonding agent may include (meth)acrylic, urethane-acrylic, and epoxy bonding agents, although the present disclosure is not limited thereto. For example, the bonding layer 310 may be formed of a UV-curable bonding agent including a (meth)acrylic compound and an epoxy compound. The (meth)acrylic compound and the epoxy compound are the same as those well-known to those skilled in the art.

When the bonding layer 310 is formed of the water-based bonding agent, the bonding layer 310 may have a thickness of about 0.1 μm to about 4 μm, and when the bonding layer 310 is formed of the UV-curable bonding agent, the bonding layer 310 may have a thickness of about 1 μm to about 4 μm. When the thickness of the bonding layer 310 falls within this range, a gap generated between the polarizer 100 and the first polarizer protective film 200 due to the light shielding layer 320 can be filled with the bonding layer, thereby improving durability of the polarizing plate. That is, the bonding layer 310 can minimize deviation between a region in which the light shielding layer 320 is present and a region in which the light shielding layer 320 is not present between the polarizer 100 and the first polarizer protective film 200.

First Polarizer Protective Film

The first polarizer protective film 200 may be formed on one surface of the bonding layer 310 to support the bonding layer 310 and the polarizer 100.

The first polarizer protective film 200 may be an optically transparent protective film. For example, the first polarizer protective film 200 may be formed of at least one selected from among polyesters such as polyethylene terephthalate (PET), polybutylene terephthalate, polyethylene naphthalate, and polybutylene naphthalate, acryl, cyclic olefin polymer (COP), cellulose esters such as triacetylcellulose (TAC), polyvinyl acetate, polyvinyl chloride (PVC), polynorbornene, polycarbonate (PC), polyamide, polyacetal, polyphenylene ether, polyphenylene sulfide, polysulfone, polyether sulfone, polyarylate, and polyimide.

The first polarizer protective film 200 may have a thickness of about 30 μm to about 120 μm, or about 20 μm to about 100 μm. Within this thickness range, the first polarizer protective film 210 can be used for an optical display.

The first polarizer protective film 200 may be an isotropic film or a retardation film. The isotropic film may have an in-plane retardation (Re) of about 5 nm or less at a wavelength of 550 nm, as represented by Re=(nx−ny)×d, where nx and ny are indices of refraction on the slow axis and the fast axis of the protective film at a wavelength of 500 nm, respectively, and d is the thickness of the protective film. The retardation film may have an in-plane retardation (Re) of greater than about 5 nm, for example, about 10 nm to about 15,000 nm, at a wavelength of 550 nm.

Second Polarizer Protective Film

The second polarizer protective film 400 may have the same or different characteristics than the first polarizer protective film 200 in terms of material, thickness, retardation, and the like.

Next, a polarizing plate according to another embodiment of the present invention will be described with reference to FIG. 5.

Figure 5:
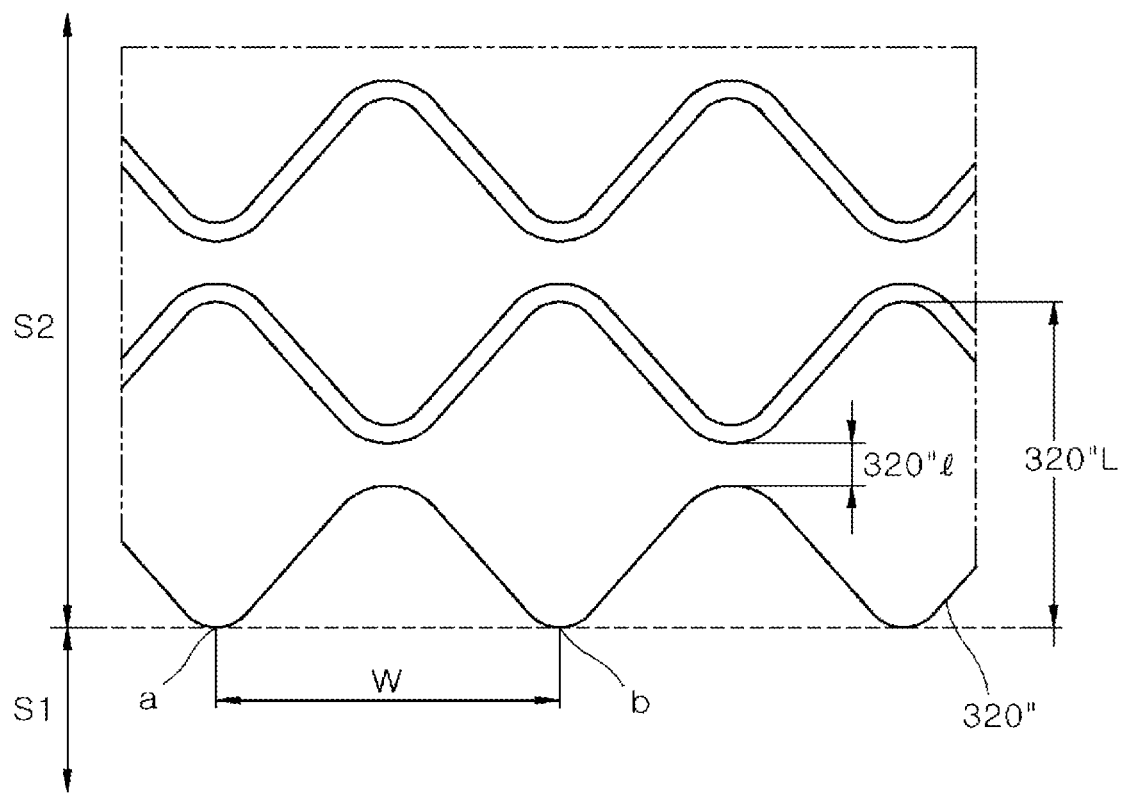
FIG. 5 is a partially enlarged plan view of a display region and a non-display region of a polarizing plate according to another embodiment of the present invention.

Referring to FIG. 5, the polarizing plate according to this embodiment is substantially the same as the polarizing plate according to the above embodiment except for printed patterns 320″ formed instead of the printed patterns 320′. FIG. 5 shows the printed pattern having an amorphous cross-sectional shape in the plane direction.

The printed patterns 320″ are separated from each other in the non-display region S2. The printed patterns 320″ have an amorphous cross-sectional shape in the plane direction. In the illustrated embodiment, the amorphous shape is composed of two curved lines facing each other, wherein convex portions and concave portions of the two curved lines are continuously alternately arranged to form a wave shape.

A point at which one printed pattern 320″ adjoins the interface between the display region S1 and the non-display region S2 is indicated by Point a. A point at which another printed pattern 320″ adjacent to the one printed pattern 320′ adjoins the interface between the display region S1 and the non-display region S2 is indicated by Point b. A distance between Point a and Point b is indicated by W, W may be about 10 μm to about 500 μm, for example, about 10 μm to about 490 μm or about 10 μm to about 480 μm. Within this range of W, the light shielding layer can achieve the light shielding effect and uniformity between the display region S1 and the non-display region S2 can be improved to reduce a visibility difference therebetween while preventing RGB in a pixel from being visible.

A maximum major axis 320″L of the printed pattern 320″ may have a length of about 50 μm to about 600 μm, for example, about 100 μm to about 500 μm. In one embodiment, the length of the maximum major axis 320″L may extend from the convex portion of one curved line to the convex portion of the other curved line of the printed pattern 320″ and may be the maximum length of a line connecting one point of one of the two curved lines to one point of the other curved line. A minimum major axis 320″I of the printed pattern 320″ may have a length of about 1 μm to about 50 μm, for example, about 1 μm to about 40 μm. In one embodiment, the length of the minimum major axis 320″I may extend from the concave portion of one curved line to the concave portion of the other curved line of the printed pattern and may be the minimum length of a line connecting one point of one of the two curved lines to one point of the other curved line.

A length difference between the maximum major axis 320″L and the minimum major axis 320″I of the printed pattern 320″ may be about 200 μm or less, for example, about 0.1 μm to about 200 μm, about 10 μm to about 200 μm, or about 180 μm to about 200 μm. Within this range of length difference between the maximum major axis 320″L and the minimum major axis 320″I, the light shielding layer can achieve the light shielding effect and uniformity between the display region S1 and the non-display region S2 can be improved to reduce a visibility difference therebetween while preventing RGB in a pixel from being visible.

FIG. 5 shows the amorphous shape composed of the two curved lines facing each other. Alternatively, the printed patterns may have an amorphous shape in which a curved line faces a linear line and convex portions and concave portions are continuously alternately arranged, an amorphous shape in which two linear lines are disposed to face each other and convex portions and concave portions are continuously alternately arranged, or modifications thereof.

Next, a polarizing plate according to a further embodiment of the present invention will be described with reference to FIG. 6.

Figure 6:
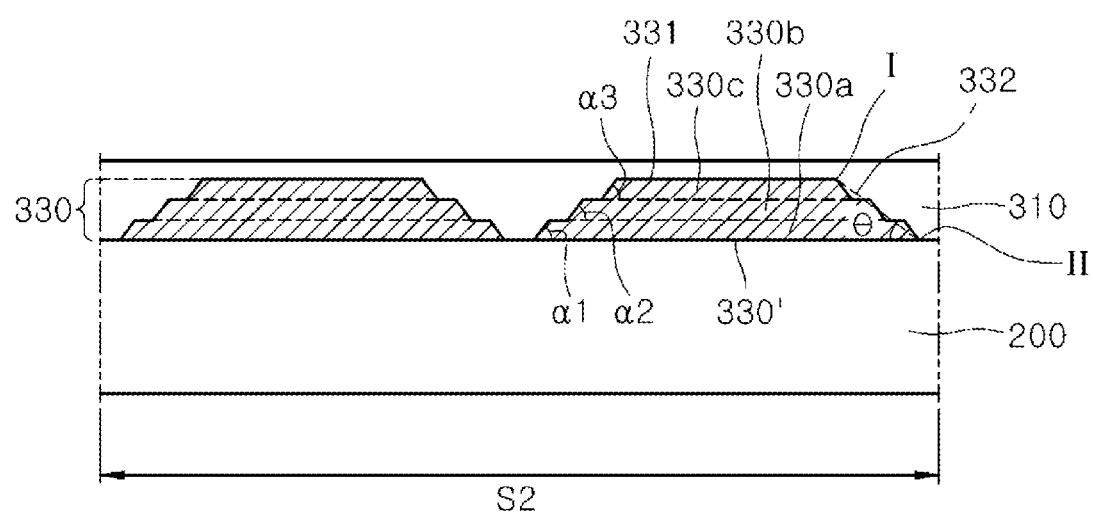
FIG. 6 is an enlarged sectional view of the non-display region of the polarizing plate according to another embodiment of the present invention.

Referring to FIG. 6, the polarizing plate according to this embodiment is substantially the same as the polarizing plate according to the above embodiment except for a light shielding layer 330 formed instead of the light shielding layer 320.

The light shielding layer 330 includes printed patterns 330′ each having a trilayer structure, in which a first printed layer 330a, a second printed layer 330b and a third printed layer 330c are sequentially stacked on the first polarizer protective film 200. The light shielding layer 330 is composed of a plurality of printed patterns 330′ separated from each other to constitute at least a portion of the non-display region.

Although FIG. 6 shows the structure wherein each of the printed patterns 330′ is composed of three printed layers, the number of printed layers in each printed pattern can be changed to two or more so long as the thickness of the light shielding layer does not exceed the thickness of the bonding layer 310. The printed patterns 330′ shown in FIG. 6 may be formed by printing a composition for printed layers three times.

The printed pattern 330′ may have a first surface 331 at the top portion thereof, a second surface 333 at the bottom portion thereof, and a side 334 having an inclined angle θ of greater than about 0° to about 85°, for example, about 0.1° to about 50°, about 0.1° to about 30°, or about 0.1° to about 10°. Within this range of the inclined angle θ, the light shielding layer 330 can suppress bubble generation upon bonding of the polarizer to the protective film 200 having the light shielding layer 330 thereon via a bonding agent (e.g., the bonding layer 310) and can achieve black uniformity. In one embodiment, the inclined angle θ is an interior angle defined between the second surface 333 of the printed pattern 330′ and an imaginary line 332 (I-II) connecting a first distal end point I of the first surface 331 at the top portion of the printed pattern 330′ to a second distal point II of the second surface 333 of the printed pattern 330′ adjoining the upper surface of the first polarizer protective film 200 facing the lower surface of the polarizer 100 and closest to the first distal end point I.

The first printed layer 330a, the second printed layer 330b, and the third printed layer 330c may have a base angle α1, a base angle α2, and a base angle α3, respectively, of greater than about 0° to less than about 90°, for example, about 30° to about 85° or about 45° to about 85°. Within this range of the base angle, the light shielding layer 330 can prevent bubble generation upon bonding of the polarizer to the protective film 200 having the light shielding layer 330 thereon via a bonding agent (e.g., the bonding layer 310), and can achieve black uniformity.

Although FIG. 6 shows the structure wherein the base angle α1, the base angle α2, and the base angle α3 of each of the printed layers are the same, it should be understood that the base angle α1, the base angle α2, and the base angle α3 may be different from one another. For example, the base angles may gradually increase or decrease from the first polarizer protective film 200.

In this embodiment, the first printed layer 330a, the second printed layer 330b, and the third printed layer 330c may have the same cross-sectional shape in the thickness direction thereof. However, it should be understood that the present invention is not limited thereto and the first printed layer 330a, the second printed layer 330b, and the third printed layer 330c may have different cross-sectional shapes in the thickness direction thereof. The first printed layer 330a, the second printed layer 330b, and the third printed layer 330c may have the same or different thicknesses with increasing distance from the first polarizer protective film 200. For example, each of the printed layers 330a, 330b, 330c may have a thickness of less than about 4 μm, for example, about 0.1 μm to less than about 4 μm. In this embodiment, each of the first printed layer 330a, the second printed layer 330b and the third printed layer 330c has a trapezoidal cross-sectional shape in the thickness direction thereof. However, it should be understood that the present invention is not limited thereto. Alternatively, in one or more embodiments, the first printed layer 330a, the second printed layer 330b and the third printed layer 330c may have a trapezoidal cross-sectional shape with a curved surface on at least a portion thereof, an N-gonal shape (N being an integer of 5 to 10), or an N-gonal shape with a curved surface on at least a portion thereof.

Each of the first printed layer 330a, the second printed layer 330b, and the third printed layer 330c may have a hexagonal cross-sectional shape in the plane direction. However, it should be understood that the present invention is not limited thereto. For example, each of the first printed layer 330a, the second printed layer 330b, and the third printed layer 330c may have an n-gonal shape (n being an integer of 3 to 10), such as a rhombus shape (n+4), a regular hexagonal shape (n=6) and an octagonal shape (n=8), a circular shape, an elliptical shape, or an amorphous shape. In the cross-sectional shape of the printed layers in the plane direction, sides constituting each of the printed layers may have the same or different lengths. For example, each of the sides constituting the printed pattern 320' may have a length of about 10 μm to about 400 μm, for example, about 50 μm to about 300 μm. In one embodiment, the printed layers may have a regular hexagonal, rhombus or amorphous cross-sectional shape in the plane direction. As shown in FIG. 6, the first printed layer 330a, the second printed layer 330b, and the third printed layer 330c may have a gradually decreasing unit area with increasing distance from the first polarizer protective film 200 in the plane direction thereof, although the present disclosure is not limited thereto.

Figure 7:
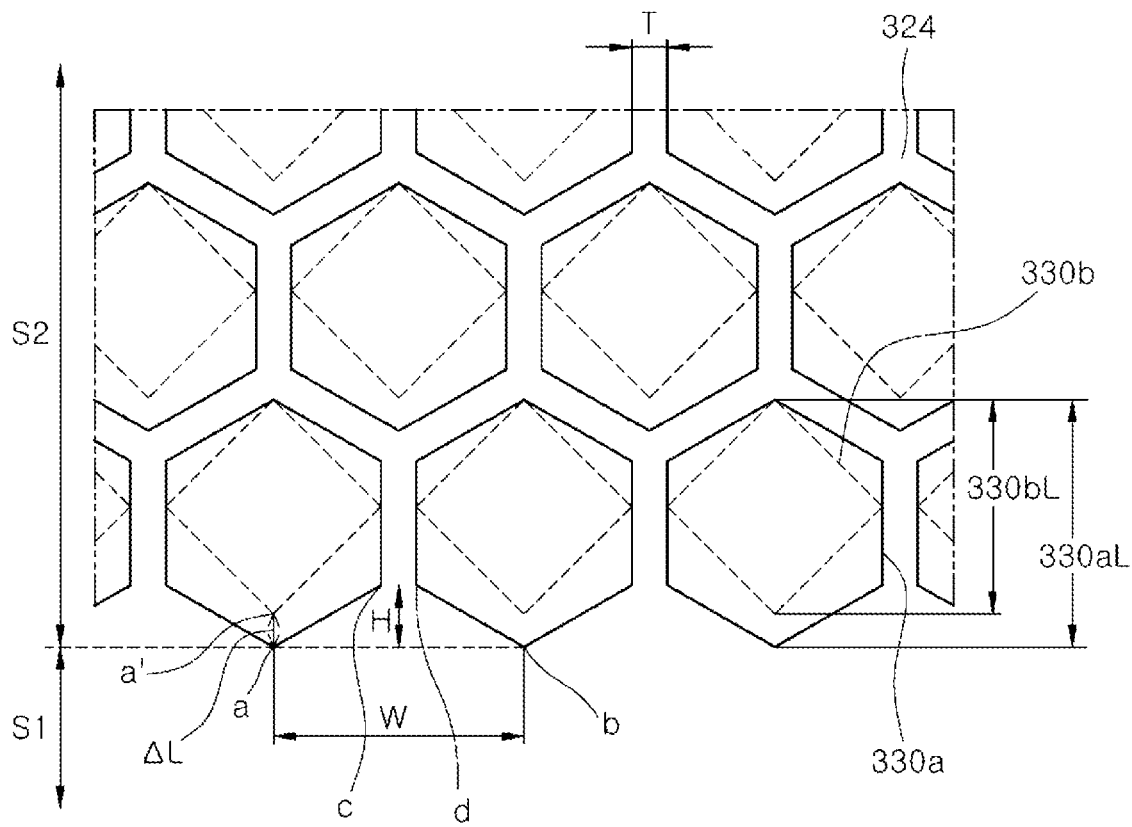
FIG. 7 is an enlarged plan view of printed patterns between the display region and the non-display region shown in FIG. 6.

FIG. 7 is an enlarged plan view of printed patterns between the display region and the non-display region shown in FIG. 6.

Referring to FIG. 7, the point at which the first printed layer 330a of one printed pattern 330' adjoins the interface between the display region S1 and the non-display region S2 is indicated by Point a, and the point at which the first printed layer 330a of another printed pattern 330' adjacent to the one printed pattern 330' adjoins the interface between the display region S1 and the non-display region S2 is indicated by Point b. A distance between Point a and Point b is indicated by W. In addition, the closest vertex or inflection point of the first printed layer 330a to Point a is indicated by Point c and the closest vertex or inflection point of the first printed layer 330a to Point b is indicated by Point d. A minimum value among the distance from the interface between the display region S1 and the non-display region S2 to Point c and the distance from the interface between the display region S1 and the non-display region S2 to Point d is indicated by H. In one embodiment, H may be about 200 μm or less, for example, about 0.1 μm to about 200 μm, or about 5 μm to about 200 μm, and W and H are set to satisfy Relation 1 above.

The point at which the first printed layer 330a adjoins the interface between the display region S1 and the non-display region S2 is indicated by Point a and the closest point of the second printed layer 330b to the interface between the display region S1 and the non-display region S2 is indicated by Point a'. The shortest distance ΔL between Point a and Point a' may be about 200 μm or less, for example, about 0.1 μm to about 200 μm, or about 10 μm to about 200 μm. Within this range, the light shielding layer 330 can achieve the light shielding effect and uniformity between the display region S1 and the non-display region S2 can be improved to reduce a visibility difference therebetween while preventing RGB in a pixel from being visible.

A difference in length between a maximum major axis 330aL of the first printed layer 330a and a maximum major axis 330bL of the second printed layer 330b may be 200 μm or less, for example, about 0.1 μm to about 200 μm, or about 10 μm to about 200 μm. Within this range, the light shielding layer 330 can achieve the light shielding effect and uniformity between the display region S1 and the non-display region S2 can be improved to reduce a visibility difference therebetween while preventing RGB in a pixel from being visible.

The maximum major axis 330aL of the first printed layer 330a may have a length of about 50 μm to about 600 μm, for example, about 100 μm to about 500 μm, and the maximum major axis 330bL of the second printed layer 330b may have a length of about 50 μm to about 500 μm, preferably about 50 μm to about 350 μm.

In one embodiment, the maximum major axis 330bL of the second printed layer 330b may have a shorter length than the maximum major axis 330aL of the first printed layer 330a and thus the second printed layer 330b may have a smaller unit area than the first printed layer 330a. In another embodiment, the maximum major axis 330bL of the second printed layer 330b has a longer length than the maximum major axis 330aL of the first printed layer 330a, and the number of the second printed layers 330b per unit area of the non-display region may be greater than that of the first printed layers 330a.

The printed patterns are separated from each other. A separation distance T between the printed patterns 330' may range from about 1 μm to about 50 μm, for example, about 5 μm to about 30 μm. Within this range, the light shielding layer 330 can achieve the light shielding effect without adversely affecting uniformity.

In FIG. 6 and FIG. 7, the first printed layer 330a is shown as the lowermost printed layer of the printed pattern 330', which directly contacts the first polarizer protective film 200. However, it should be understood that the present invention is not limited thereto and the first printed layer 330a may be interposed between other printed layers without contacting the first polarizer protective film 200.

Next, a polarizing plate according to yet another embodiment of the present invention will be described with reference to FIG. 8.

Figure 8:
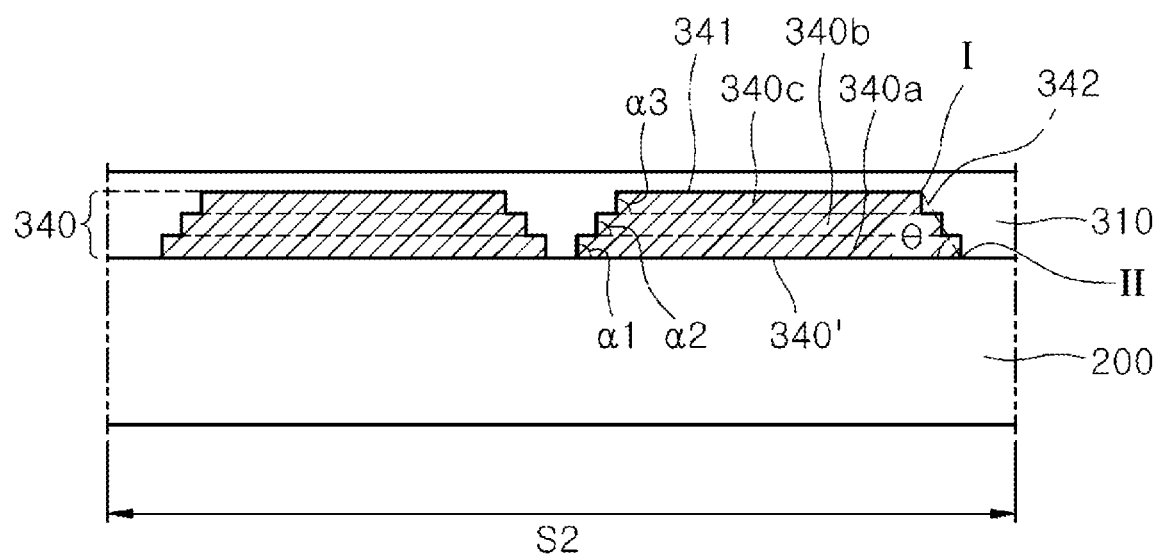
FIG. 8 is an enlarged sectional view of a non-display region of a polarizing plate according to a further embodiment of the present invention.

Referring to FIG. 8, the polarizing plate according to this embodiment is substantially the same as the polarizing plate according to the above embodiment except for a light shielding layer 340 formed instead of the light shielding layer 320.

The light shielding layer 340 includes printed patterns 340' each having a trilayer structure, in which a first printed layer 340a, a second printed layer 340b and a third printed layer 340c are sequentially stacked on the first polarizer protective film 200. The light shielding layer 340 is composed of a plurality of printed patterns 340' separated from each other to constitute at least a portion of the non-display region.

Although FIG. 8 shows the structure wherein each of the printed patterns 340' is composed of three printed layers, the number of printed layers in each printed pattern can be changed so long as the thickness of the light shielding layer does not exceed the thickness of the bonding layer 310. The printed pattern 340' may have a first surface 341 at the top portion thereof, a second surface 343 at a bottom surface thereof, and a side 344 having an inclined angle θ of greater than about 0° to about 85°, for example, about 0.1° to about 50°, about 0.1° to about 30°, or about 0.1° to about 10°. Within this range of the inclined angle θ, the light shielding layer 340 can suppress bubble generation upon bonding of the polarizer to the protective film 200 having the light shielding layer 340 thereon via a bonding agent (e.g., the bonding layer 310) and can achieve black uniformity. In the illustrated embodiment, the inclined angle θ is defined as an interior angle between the second surface 343 of the printed pattern 340' and an imaginary line 342 (I-II) connecting a first distal end point I of the first surface 341 at the top portion of the printed pattern 340' to a second distal end point II of the second surface 343 of the printed pattern 340' adjoining the upper surface of the first polarizer protective film 200 facing the lower surface of the polarizer 100 and closest to the first distal end point I.

The first printed layer 340a, the second printed layer 340b, and the third printed layer 340c may have a base angle α1, a base angle α2, and a base angle α3 of about 90°, respectively, and may have a rectangular or square cross-sectional shape in the thickness direction thereof. However, it should be understood that the present invention is not limited thereto. Each of the printed layers may have different base angles. For example, the base angles of the printed layers may gradually increase or decrease from the first polarizer protective film 200.

The first printed layer 340a, the second printed layer 340b, and the third printed layer 340c may have the same or different thicknesses with increasing distance from the first polarizer protective film 200.

Each of the first printed layer 340a, the second printed layer 340b, and the third printed layer 340c may have a hexagonal cross-sectional shape in the plane direction thereof. However, it should be understood that the present invention is not limited thereto. For example, each of the first printed layer 340a, the second printed layer 340b, and the third printed layer 340c may have an n-gonal shape (n being an integer of 3 to 10), such as a rhombus shape (n=4), a regular hexagonal shape (n=6) and an octagonal shape (n=8), a circular shape, an elliptical shape, or an amorphous shape. In the cross-sectional shape of the printed layers in the plane direction, sides constituting each of the printed layers may have the same or different lengths. For example, each of the sides constituting the printed pattern 340' may have a length of about 10 μm to about 400 μm, for example, about 50 μm to about 300 μm. In one embodiment, the printed layers 340a, 340b, 340c may have a regular hexagonal, rhombus or amorphous cross-sectional shape in the plane direction. As shown in FIG. 8, the first printed layer 340a, the second printed layer 340b, and the third printed layer 340c may have a gradually decreasing unit area with increasing distance from the first polarizer protective film 200 in the plane direction thereof, although the present disclosure is not limited thereto.

The present invention may provide an optical display including the polarizing plate according to the embodiments of the present invention described above. The optical display may include a liquid crystal display, a light emitting display including an organic light emitting diode display, and the like. The polarizing plate may be disposed at the viewer side of the liquid crystal display.

Next, the present invention will be described in more detail with reference to some examples. However, it should be noted that these examples are provided for illustration only and are not to be construed in any way as limiting the present invention.

Preparative Example

A pigment dispersion (A) containing 30 wt % of a pigment was used as a black pigment. A pigment dispersion (A-1) comprising a silver-tin alloy (TMP-DC-1, Sumitomo Oosaka Cement Co., Ltd.) (solid content: 30%, weight ratio of silver to tin=7:3) and a pigment dispersion (A-2) comprising carbon black (CI-M-050, Sakata Co., Ltd.) were used. As binder resins (B), an aliphatic polyurethane (SUO-1000, Shina T&C Co., Ltd.) (B1) and an acrylic pressure-sensitive adhesive resin (WA-9263, Wooin ChemTech Co., Ltd.) (B2) were used. A melamine curing agent (M60, Wooin ChemTech Co., Ltd.) was used as a heat-curing initiator (C), propylene glycol methylether acetate was used as a solvent (D); and a silane coupling agent (765W, Tego Co., Ltd.) was used as a silane coupling agent (E).

Compositions for the printed layers were prepared by mixing the pigment dispersion, the binder resin, the initiator, the solvent, and the silane coupling agent described above in amounts as listed in Table 1.

TABLE 1

| (unit: wt %) | | | | | | |
|---|---|---|---|---|---|---|
| A (wt %) | | B-1 | B-2 | C | D | E |
| A-1 | A-2 | (wt %) | (wt %) | (wt %) | (wt %) | (wt %) |
| 25 | 20 | 8 | 3 | 3 | 40 | 1 |

Example 1

Printed patterns were formed along the periphery of an upper surface of a polyethylene terephthalate (PET) film through gravure coating of the composition for printed layers prepared in Preparative Example. The printed patterns had a bilayer structure of printed patterns including a first printed layer and a second printed layer sequentially formed on the PET film. A print roll for the first printed layer was formed with printed patterns having a regular hexagonal shape, each side of which had a length of 50 μm, and separated from each other. After printing the first printed pattern, a second printed pattern was formed thereon using another print roll for the second printed layer. A print roll for the second printed layer was formed with printed patterns having a rhombus shape, each side of which had a length of 50 μm, and separated from each other. A light shielding layer (thickness: 2.4 μm) was formed by heat-curing at 85° C. for 2 minutes. The shapes of the printed patterns are shown in Table 2 and the printed patterns were formed in shapes shown in FIG. 7.

A polyvinyl alcohol film (thickness: 60 μm, polymerization degree: 2,400, saponification degree: 99.0%, VF-PS6000, Kuraray Co., Ltd., Japan) was subjected to swelling in an aqueous solution at 25° C., followed by dyeing and stretching in an iodine ion-containing dyeing bath at 30° C. Then, the dyed polyvinyl alcohol film was further stretched to 6 times an initial length thereof in a boric acid solution at 55° C., thereby preparing a polarizer (thickness: 22 μm).

A bonding agent was applied to one surface of the PET film on which the light shielding layer was formed and bonded to one surface of the polarizer. Then, the bonding agent was applied to one surface of a cycloolefin polymer film (ZB12-052125, Zeon Corporation) as a second polarizer protective film and bonded to the other surface of the polarizer, followed by UV curing, thereby preparing a polarizing plate. Each of the bonding layers had a thickness of 3 μm. An adhesive layer (OS-207, Soken) was formed on one surface of the cyclo-olefin polymer film.

Example 2 to Example 5 and Comparative Example 1

Each of polarizing plates was prepared in the same manner as in Example 1 except that the printed patterns were changed as listed in Table 2.

The polarizing plates prepared in Examples and Comparative Example were evaluated as to the following properties shown in Table 2.

(1) Light shielding properties: Light shielding properties were measured on the light shielding layer of each of the polarizing plates prepared in Examples and Comparative Example through a UV filter using a densitometer (TD-904: Gretag Macbeth Company) in accordance with JIS K7651: 1988. In Table 2, the light shielding layers were evaluated based on absorbance at a wavelength of 550 nm in a UV-visible spectrophotometer (JASC0-750). An absorbance value of 2.0 or more was rated as ⊚, an absorbance value of greater than 1.5 to less than 2.0 was rated as ○, an absorbance value of greater than 1.0 to 1.5 was rated as Δ, and an absorbance value of 1.0 or less was rated as X. A higher absorbance value indicates better light shielding properties.

(2) Bubble generation: Bubble generation was observed at an interface between a display region and a non-display region of each of the polarizing plates prepared in Examples and Comparative Example through a microscope at 250× magnification. Generation of bubbles was determined based on sizes of the bubbles. ⊚ means a bubble size of 300 μm or more, ○ means a bubble size of larger than 100 μm to less than 300 μm, Δ means a bubble size of larger than 10 μm to 100 μm, and X means a bubble size of 10 μm or less.

Conversely, the polarizing plate of Comparative Example 1 suffered from severe bubble generation at the interface upon bonding of the polarizer to the protective film such that the bubbles could be clearly observed on the polarizing plate. Moreover, the polarizing plate of Comparative Example 1 had a poorer light shielding effect due to lower black uniformity of the light shielding layer than the polarizing plates of Examples of the present invention.

The present invention provides a polarizing plate that includes a polarizer protective film including a light shielding layer formed thereon, which can prevent bubble generation or minimize the size of bubbles upon bonding of the polarizer protective film to a polarizer.

The present invention provides a polarizing plate that can improve black uniformity of the light shielding layer to improve a light shielding effect.

It should be understood that various modifications, changes, alterations, and equivalent embodiments can be made by those skilled in the art without departing from the spirit and scope of the present invention.

What is claimed is:

1. A polarizing plate comprising:
   a polarizer;
   a bonding layer and a first polarizer protective film sequentially stacked on a lower surface of the polarizer;
   a second polarizer protective film stacked on an upper surface of the polarizer; and
   a light shielding layer on an upper surface of the first polarizer protective film facing the lower surface of the polarizer,
   the light shielding layer comprising at least one printed pattern having at least one printed layer,

TABLE 2

|  |  | Example |  |  |  |  | Comparative |
|---|---|---|---|---|---|---|---|
|  |  | 1 | 2 | 3 | 4 | 5 | Example 1 |
| Thickness of light shielding layer (μm) |  | 2.4 | 2.3 | 2.7 | 2.6 | 2.7 | 2.4 |
| Number of printed layers |  | 2 | 2 | 2 | 2 | 2 | 1 |
| First printed layer | Cross-sectional shape in plane direction | Regular hexagonal shape | Regular hexagonal shape | Regular hexagonal shape | Regular hexagonal shape | Rhombus shape | Regular Hexagonal shape |
|  | Length of one side (μm) | 50 | 50 | 50 | 50 | 50 | 50 |
|  | Base angle (α) (°) | 75 | 75 | 80 | 80 | 85 | 90 |
| Second printed layer | Cross-sectional shape in plane direction | Rhombus shape | Rhombus shape | Amorphous | Amorphous | Amorphous | — |
|  | Length of one side (μm) | 50 | 50 | — | — | — | — |
|  | Base angle (α) (°) | 75 | 75 | 80 | 80 | 85 | — |
| H (μm) |  | 30 | 30 | 30 | 30 | 40 | 30 |
| W (μm) |  | 200 | 200 | 150 | 150 | 170 | 150 |
| ΔL (μm) |  | 29 | 29 | 25 | 25 | 25 | — |
| Inclined angle(θ) (°) |  | 4.7 | 4.6 | 6.1 | 5.9 | 6.1 | 90 |
| Light shielding properties |  | ⊚ | ⊚ | ⊚ | ⊚ | ⊚ | ○ |
| Generation of bubbles |  | X | X | Δ | Δ | Δ | ⊚ |

As shown in Table 2, the polarizing plates according to the present invention did not suffer from bubble generation or could minimize or at least reduce the size of bubbles upon bonding of the polarizer to the protective film, as compared with the Comparative Example 1. In addition, the polarizing plates according to the present invention could improve light shielding effects through improvement in black uniformity of the light shielding layer, as compared with Comparative Example 1.

the at least one printed pattern having a first surface at a top portion thereof, a second surface at a bottom portion thereof, and a side being inclined at an inclined angle in a range from greater than about 0° to about 85°, the inclined angle being defined as an interior angle between the second surface of the at least one printed pattern and an imaginary line connecting a first distal end point of the first surface at the top portion of the at least one printed pattern to a second distal end point of the second surface of the at least one printed pattern on the first polarizer protective film and closest to the first distal end point.

2. The polarizing plate according to claim 1, wherein the range is from about 0.1° to about 50°.

3. The polarizing plate according to claim 1, wherein the at least one printed layer has a base angle α of greater than about 0° to about 90°.

4. The polarizing plate according to claim 1, wherein the light shielding layer has a smaller thickness than the bonding layer.

5. The polarizing plate according to claim 1, wherein the at least one printed pattern comprises a single printed layer, the single printed layer having a base angle α of greater than about 0° to about 85°.

6. The polarizing plate according to claim 1, wherein the printed pattern comprises a plurality of printed layers, each of the plurality of printed layers having a base angle α of greater than about 0° to less than about 90°.

7. The polarizing plate according to claim 6, wherein the plurality of printed layers have a gradually decreasing cross-sectional area in a plane direction thereof with increasing distance from the first polarizer protective film.

8. The polarizing plate according to claim 6, wherein the printed layers of the plurality of printed layers have the same thickness or different thicknesses with increasing distance from the first polarizer protective film.

9. The polarizing plate according to claim 1, wherein the printed pattern is composed of a plurality of printed layers, each of the plurality of printed layers having a base angle α of about 90°.

10. The polarizing plate according to claim 9, wherein the plurality of printed layers have a gradually decreasing cross-sectional area in a plane direction thereof with increasing distance from the first polarizer protective film.

11. The polarizing plate according to claim 9, wherein the printed layers of the plurality of printed layers have the same thickness or different thicknesses with increasing distance from the first polarizer protective film.

12. The polarizing plate according to claim 1, wherein the at least one printed pattern comprises a plurality of printed patterns separated from each other.

13. The polarizing plate according to claim 12, wherein:
the polarizing plate comprises a display region and a non-display region,
the light shielding layer constitutes at least a portion of the non-display region,
each of the plurality of printed patterns comprises a first printed layer,
the first printed layer of a first printed pattern comprises a first point at an interface between the display region and the non-display region;
the first printed layer of the first printed pattern comprises a second point at a vertex or inflection point of the first printed layer that is closest to the first point,
the first printed layer of a second printed pattern adjacent to the first printed pattern comprises a third point at the interface,
the first printed layer of the second printed pattern comprises a fourth point at a vertex or inflection point of the first printed layer that is closest to the third point of the second printed pattern, and
a minimum value among a distance from the interface between the display region and the non-display region to the second point and a distance from the interface between the display region and the non-display region to the fourth point is about 200 μm or less.

14. The polarizing plate according to claim 1, wherein the at least one printed layer has a regular hexagonal, rhombus, or amorphous cross-sectional shape in a plane direction.

15. The polarizing plate according to claim 1, wherein the at least one printed pattern comprises a photocurable composition or a thermosetting composition, the photocurable composition and the thermosetting composition comprising a pigment, a binder resin, and an initiator.

16. The polarizing plate according to claim 15, wherein the pigment comprises at least one of carbon black and a silver-tin alloy.

17. The polarizing plate according to claim 15, wherein each of the photocurable composition and the thermosetting composition further comprises at least one of a photocurable unsaturated compound and a thermosetting unsaturated compound.

18. The polarizing plate according to claim 1, wherein the bonding layer comprises a bonding agent comprising a (meth)acrylic compound and an epoxy compound.

19. An optical display comprising the polarizing plate according to claim 1.

* * * * *